United States Patent Office 3,176,014
Patented Mar. 30, 1965

3,176,014
PROCESS AND 5-OXYGENATED INTERMEDIATES FOR THE MANUFACTURE OF 19-NORSTEROIDS OF THE ANDROSTANE SERIES
Raphael Pappo, Skokie, and Leonard N. Nysted, Highland Park, Ill., assignors to G. D. Searle & Co., Chicago, Ill., a corporation of Delaware
No Drawing. Filed Feb. 6, 1964, Ser. No. 343,115
17 Claims. (Cl. 260—239.55)

The present invention relates to a novel process and novel intermediates useful in the manufacture of 19-norsteroids of the androstane series. Those intermediates are 5α-(lower alkanoyloxy)-6β-19-epoxy compounds which can be represented by the following structural formula

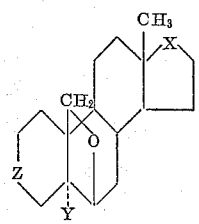

wherein X and Z are symbolic of carbonyl, β-hydroxymethylene, or β-(lower alkanoyl)oxymethylene groups, and Y is a lower alkanoyloxy radical.

Exemplary of the lower alkanoyl radicals encompassed by the X, Y and Z terms are acetyl, propionyl, butyryl, valeryl, caproyl, and the branched-chain groups isomeric therewith.

Preferred starting materials required for the conduct of the present invention are those substances represented by the structural formula

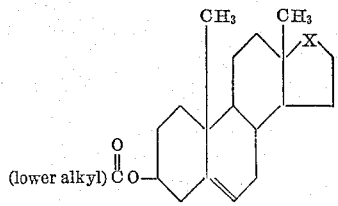

wherein X can be either a carbonyl, ketalized carbonyl, or β-(lower alkanoyl)oxymethylene group. Those materials can be converted, typically by reaction with N-bromo-acetamide and perchloric acid in aqueous tetrahydrofuran, to the corresponding 5α,6β-bromohydrins, which substances are dehydrobrominated, suitably by means of potassium acetate in aqueous dioxane, resulting in formation of the 5β,6β-epoxy group. These processes are specifically illustrated by the conversion of 3β-acetoxyandrost-5-en-17-one to 3β-actoxy-5α-bromo-6β-hydroxyandrostan-17-one and dehydrobromination of the latter substance to afford 3β-acetoxy-5β,6β-epoxyandrostan-17-one. These 5β,6β-epoxides can be converted to the instant novel 5α-acetoxy-6β,19-epoxy derivatives directly by oxidation with a suitable reagent such as lead tetraacetate, lead tetraacetate and iodine, mercuric acetate and iodine, or silver acetate and iodine, or by the alternate route of conversion first to the 5α,6β-diol 5-acetate followed by oxidation with one of the aforementioned reagents. Thus, 3β-acetoxy-5β,6β-epoxyandrostan-17-one is contacted with lead tetraacetate and iodine in acetic acid to produce 3β,5α-diacetoxy-6β,19-epoxyandrostan-17-one. Alternatively, the latter 5β,6β-epoxide is converted to 3β,5α-diacetoxy-6β-hydroxyandrostan-17-one by reaction with acetic acid in the presence of p-toluenesulfonic acid, and that diacetate is oxidized to the corresponding 6β,19-epoxide by reaction with lead tetraacetate and iodine in acetic acid. The use of alkanoic acids other than acetic affords the corresponding 5α-(lower alkanoates). Selective hydrolysis of the 3-acyloxy group and also the 17-acyloxy group, in those intermediates containing the latter substituent, without affecting the 5α-(lower alkanoyl)oxy moiety is effected by means of mineral acid such as hydrochloric or sulfuric acid or by basic reagents such as potassium carbonate in a polar anhydrous solvent medium. Lower alkanols such as methanol are particularly suitable. In that manner, 3β,5α-diacetoxy-6β,19-epoxyandrostan-17-one is contacted with hydrogen chloride in methanol to afford 5α-acetoxy-6β,19-epoxy-3β-hydroxyandrostan-17-one. Oxidation of those 5α-acetoxy-6β,19-epoxy-3β-ols carrying either a 17β-hydroxy or 17-oxo substituent, suitably with chromium trioxide and aqueous sulfuric acid in acetone, results in 5α-acetoxy-6β,19-epoxyandrostane-3,17-dione. Conversion of that precursor directly to the desired 19-hydroxyandrost-4-ene-3,17-dione is accomplished by heating with a mixture of zinc and zinc chloride in ethanol. An alternate route for conversion of the 3β,5α-di-(lower alkanoyl)oxy-6β,19-epoxy intermediates to 19-hydroxyandrost-4-ene-3,17-dione involves heating with aqueous sodium hydroxide in methanol to effect hydrolysis of both ester groups, oxidation of the resulting 3β,5α-dihydroxy substance with chromic acid to yield 6β,19-epoxy-5α-hydroxyandrostane-3,17-dione and reaction of the latter precursor with zinc and zinc chloride to afford the desired end product.

An alternate scheme for producing the instant 5α-acetoxy-6β,19-epoxy intermediates involves the consecutive steps of epoxidation with an organic peracid such as peracetic or perbenzoic acid of the starting materials of the formula

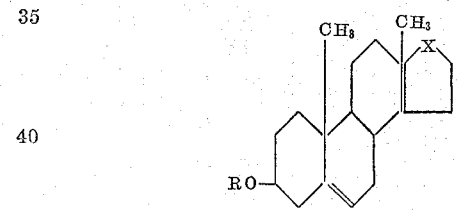

wherein R is hydrogen or a lower alkanoyl radical and X is a carbonyl, ketalized carbonyl, or β-(lower alkanoyl)oxymethylene group, followed by cleavage of the resulting epimeric mixture of 5,6-epoxides to afford the 3β,5α,6β-triol, acylation of those triols with acetic acid and acetic anhydride in the presence of p-toluene-sulfonic acid to produce the 3β,5α,6β-triacetoxy derivative, selective hydrolysis of the 3-and 6-acetoxy groups by heating with a basic reagent such as tetramethylguanidine, potassium carbonate, or sodium carbonate in an anhydrous polar medium such as a lower alkanol, for example methanol, selective acylation of the 3-hydroxy group of the resulting 3β,6β-dihydroxy compound, for example with acetic acid and acetic anhydride in pyridine, and oxidation with lead tetraacetate and iodine of the resulting 3β,5α-diacetoxy-6β-hydroxy compound. By that sequence of reactions, 3β-acetoxyandrost-5-en-17-one, for example, is converted to 3β,5α - diacetoxy-6β,19-epoxyandrostan-17-one.

19-hydroxyandrost-4-ene-3,17-dione is useful as an intermediate in known processes for the production of useful 19-norsteroids. Thus, oxidation of the hydroxy group, typically with chromium trioxide, results in 10β-carboxyestr-4-ene-3,17-dione, which is decarboxylated by reaction with pyridine to afford estr-5(10)-ene-3,17-dione. Conversion of the latter diketone to the 3-dimethyl ketal followed by ethynylation of the 17-keto group and mild cleavage of the ketal function with a reagent such as malonic acid results in 17α-ethynyl-17β-hydroxyestr-5(10)- en-3-one, a well known progestational agent. Cleavage of the ketal function under more vigorous conditions, utilizing hydrochloric acid, for example, results in 17β-hydroxy-17α-ethynylestr-4-en-3-one, also a known progestational agent. By an analogous series of known reactions, 19-hydroxyandrost-4-ene-3,27-dione can also be converted to 17α-ethyl-17β-hydroxyestr-4-en-3-one, a well known anabolic agent.

In addition to the starting materials hereinbefore mentioned, the instant process can be applied also to compounds represented by the formula

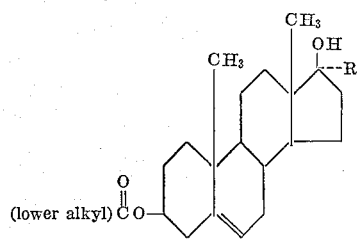

wherein R is a lower alkyl or lower alkynyl radical. Utilization of those starting materials affords the 19-hydroxy compounds of the formula

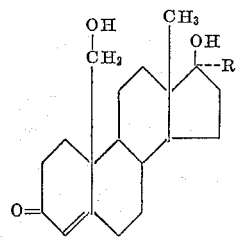

which can be converted to the corresponding 19-nor compounds by the methods described above. The latter 19-hydroxy intermediates can be produced alternatively from the instant 6β,19-epoxy intermediates. The intermediates suitable for that purpose are 6β,19-epoxy-3β,5α-dihydroxyandrostan-17-one and the corresponding 5-mono-(lower alkanoates). As a specific example, the 5-acetate is allowed to react with acetylene in the presence of potassium tertiary-pentoxide, and the resulting 17α-ethynyl-17β-hydroxy derivative is oxidized with chromium trioxide to afford 6β,19-epoxy-17α-ethynyl-5α,17β-dihydroxyandrostan-3-one. The 5α-hydroxy intermediate is, however, the preferred starting material for production of the latter product. Cleavage of that 6β,19-epoxide with zinc and zinc chloride by the procedure hereinbefore described affords 17α-ethynyl,17β,19-dihydroxyandrost-4-en-3-one.

This application is a continuation-in-part of our copending application Serial No. 288,881, filed June 19, 1963, and now abandoned.

The invention will appear more fully from the examples which follow. These examples are set forth by way of illustration only, and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

Example 1

A mixture of 9.5 parts of 5β,6β-epoxyandrostane-3β,17β-diol 3,17-diacetate, 21 parts of acetic acid, and 0.2 part of p-toluenesulfonic acid is kept at room temperature for about 64 hours, then is diluted with a mixture of ice and water. The precipitate which forms is collected by filtration, and the filter cake is washed first with a mixture of ether and water, then with acetone to afford androstane-3β,5α,6β,17β-tetrol 3,5,17-triacetate, melting at about 213–223°. Recrystallation from a mixture of benzene and ether affords the pure material, melting at about 237–239°.

Example 2

A mixture of 3.45 parts of androstane-3β,5α,6β,17β-tetrol 3,5,17-triacetate, 10.2 parts of lead tetraacetate, 3.9 parts of iodine, and 48 parts of carbon tetrachloride, in an atmosphere of nitrogen, is heated at the reflux temperature for about 8 hours. This reaction mixture is cooled and filtered, and the filtrate is washed successively with aqueous sodium iodide, aqueous sodium sulfite, and water, then dried over anhydrous sodium sulfate and stripped of solvent at reduced pressure. Recrystallization of the residue from hexane affords pure 6β,19-epoxyandrostane-3β,5α,17β-triol 3,5,17-triacetate, melting at about 161–163° and characterized also by the structural formula

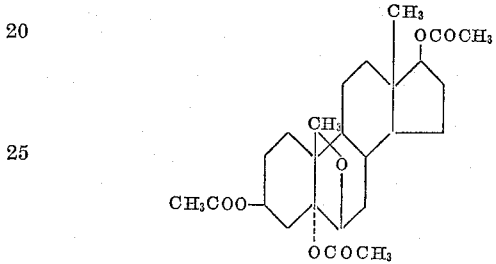

Example 3

To a warm solution of 3.9 parts of 5β,6β-epoxyandrotane-3β,17β-diol 3,17-diacetate and 2.54 parts of iodine in 42 parts of acetic acid is added 8.6 parts of lead tetraacetate with stirring, and the resulting reaction mixture is heated to approximately 65° and maintained at that temperature for about one hour. At the end of that time, an additional 4.3 parts of lead tetraacetate is added, and heating at approximately 65° is continued for about 1½ hours longer. The reaction mixture is cooled to room temperature, then is diluted with approximately 200 parts by volume of a 1:1 ether-benzene solution. To that solution is added 25 parts of zinc, and stirring is continued for about 2 hours. Removal of the yellow solids by filtration affords a filtrate which is washed successively with dilute aqueous potassium bicarbonate and aqueous sodium thiosulfate, then dried over anhydrous sodium sulfate and concentrated to an oily residue under reduced pressure. Recrystallization of that residue from aqueous methanol affords crystalline 6β,19-epoxyandrostane-3β,5α,17β-triol 3,5,17-triacetate, identical with the product of Example 2.

Example 4

A mixture of 18 parts of 3β-acetoxy-5β,6β-epoxyandrostan-17-one, 37.8 parts of acetic acid, and 0.18 part of p-toluenesulfonic acid is stirred at room temperature for about 21 hours, then is diluted with water. The resulting solid which separates is collected by filtration, washed with water, and dried. Recrystallization of this material from a mixture of acetone and hexane produces pure 3β,5α-diacetoxy-6β-hydroxyandrostan-17-one, which substance melts at about 226–229°.

Example 5

A mixture of 26 parts of 3β,5α-diacetoxy-6β-hydroxyandrostan-17-one, 59.2 parts of lead tetraacetate, 25.6 parts of iodine, and 1600 parts of carbon tetrachloride is stirred and heated at the reflux temperature for about 8 hours. The reaction mixture is cooled, and the insoluble material is removed by filtration. The filtrate is washed with aqueous sodium thiosulfate, then is dried over anhydrous sodium sulfate and concentrated to an oil at reduced pressure. This oil is crystallized from a mixture of methylene chloride and hexane to yield 3β,5α-diacetoxy-6β,19-epoxyandrostan-17-one, melting at about 112–114°. It is represented by the structural formula

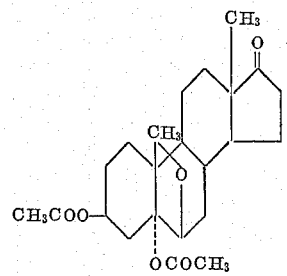

Example 6

The substitution of an equivalent quantity of 3β-acetoxy-5β,6β-epoxyandrostan-17-one in the procedure of Example 3 results in 3β,5α-diacetoxy-6β,19-epoxyandrostan-17-one, identical with the product of Example 5.

Example 7

A mixture of 10 parts of 3β,5α,6β-triacetoxyandrostan-17-one, 5 parts of tetramethylguanidine, and 40 parts of methanol is heated at the reflux temperature for about 2 hours, then is concentrated to dryness under reduced pressure. The residual oily material is triturated with a 4:1 mixture of ether and hexane, and the resulting solid is collected by filtration and washed on the filter with 4:1 ether-hexane, then dried to afford 5α-acetoxy-3β,6β-dihydroxyandrostan-17-one, melting at about 233–236°.

Example 8

To a solution of 2.5 parts of 5α-acetoxy-3β,6β-dihydroxyandrostan-17-one in 5 parts of pyridine containing 2.5 parts of acetic acid is added dropwise, over a period of about 5 minutes, 0.8 part of acetic anhydride. The reaction mixture is stirred at room temperature for about 3 hours, then is diluted carefully with approximately 50 parts of water. The precipitated solid is collected by filtration, dried, and purified by recrystallization from methylene chloride-hexane to yield 3β,5α-diacetoxy-6β-hydroxyandrostan-17-one, identical with the product of Example 4.

Example 9

To a solution of 1.5 parts of 6β,19-epoxy-3β,5α,17β-triol 3,5,17-triacetate and 64 parts of methanol is added a solution of 3 parts of sodium hydroxide in 20 parts of water. This reaction mixture is heated, under nitrogen, at the reflux temperature for about 1¼ hours, then is stripped of solvent at reduced pressure. The residue is washed with a mixture of water and chloroform, then is collected by filtration to yield 6β,19-epoxyandrostane-3β,5α,17β-triol, melting at about 259–261°. This compound is represented by the structural formula

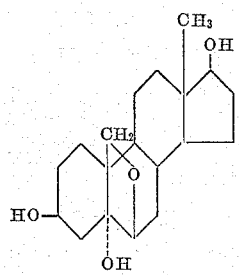

Example 10

To a solution of 6 parts of 6β,19-epoxyandrostane-3β,5α,17β-triol in 400 parts of acetone is added an aqueous solution, 8 N in chromium trioxide and 8 N in sulfuric acid, until excess reagent is present. To this mixture is then added one part of isopropyl alcohol in order to destroy the excess reagent. Removal of the solvent by distillation at reduced pressure affords a residue which is stirred with a mixture of water and chloroform. The chloroform layer is separated, then washed successively with aqueous sodium hydroxide and water. Drying over anhydrous sodium sulfate followed by distillation of the solvent at reduced pressure affords a crystalline residue which is triturated with ether to yield 6β,19-epoxy-5α-hydroxyandrostane-3,17-dione, melting at about 254.5–260° and represented by the structural formula

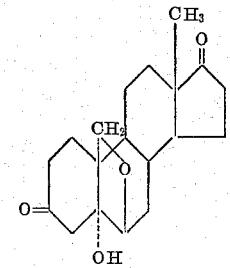

Example 11

A mixture of 2 parts of 3β,5α-diacetoxy-6β,19-epoxyandrostan-17-one, 5 parts of potassium carbonate, 64 parts of methanol, and 20 parts of water is stirred at room temperature for about 60 hours. The organic solvent is removed by distillation at reduced pressure, and approximately 30 parts of water is added. The resulting solid is collected by filtration, washed on the filter with water, and dried to yield 6β,19-epoxy-3β,5α-dihydroxyandrostan-17-one, melting at about 270–272° and represented by the structural formula

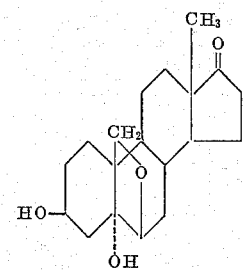

Example 12

To a solution of 44.5 parts of 3β,5α-diacetoxy-6β,19-epoxyandrostan-17-one in 176 parts of methanol is added 17.5 parts by volume of a 15% isopropanolic hydrogen chloride solution, and the resulting reaction mixture is stirred at room temperature for about 4 hours. Approximately ½ of the methanol is removed by distillation at reduced pressure, and the residual solution is diluted by the addition of approximately 200 parts of water. Further concentration of the solution at reduced pressure results in crystallization of the crude product which is collected by filtration and dried. That material melts at about 100°, then resolidifies and melts again at about 150°–160°. Recrystallization from methylene chloride-hexane affords pure 5α-acetoxy-6β,19-epoxy-3β-hydroxyandrostan-17-one, which displays a melting point at about 157–162° and is further characterized by the structural formula

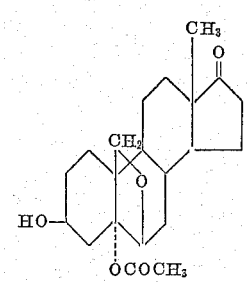

Example 13

To a rapidly stirred solution, cooled to about 10°, of 39 parts of 5α-acetoxy-6β,19-epoxy-3β-hydroxyandrostan- 17-one in 468 parts of acetone is added dropwise, over a period of about 10 minutes, 34 parts by volume of an aqueous solution, 8 N in chromium trioxide and 8 N in sulfuric acid. The resulting reaction mixture is stirred for about 5 minutes, at the end of which time a small quantity of isopropanol is added in order to destroy the excess unreacted oxidant. A portion of the solvent is removed by distillation at reduced pressure, and the residual mixture is diluted with approximately 150 parts of water. The solid which precipitates is collected by filtration, washed with water, and dried to afford the crude product, melting at about 199–202°. Recrystallization from acetone-hexane results in 5α-acetoxy-6β,19-epoxyandrostane-3,17-dione, melting at about 202–204°, and represented by the structural formula

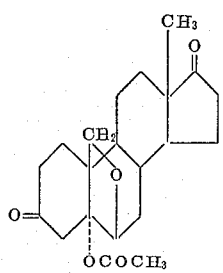

*Example 14*

To a mixture of 5 parts of 5α-acetoxy-6β,19-epoxyandrostane-3,17-dione, 50 parts of zinc, and 63 parts of ethanol is added dropwise, with stirring at the reflux temperature, a solution of 5 parts of zinc chloride in 24 parts of ethanol over a period of about 10 minutes. Heating of that reaction mixture at the reflux temperature for about 1½ hours is followed by filtration in order to remove unchanged zinc. The solvent is removed by distillation at reduced pressure, and the residue is diluted with water, then extracted with chloroform. The organic layer is separated, washed with dilute hydrochloric acid, dried over anhydrous sodium sulfate, and stripped of solvent by distillation at reduced pressure. The crystalline residue is recrystallized from methylene chloride-ethyl acetate to afford pure 19-hydroxyandrost-4-ene-3,17-dione, melting at about 169–170°.

*Example 15*

To a mixture of 0.08 part of p-toluenesulfonic acid in 16 parts of methanol is added 10 parts of 3β-acetoxy-5β,6β-epoxyandrostan-17-one, and this reaction mixture is stirred at room temperature for about 15 minutes. At the end of this time, an additional 0.08 part of p-toluenesulfonic acid and approximately 3 parts of methanol are added, and stirring is continued for about 15 minutes longer in order to achieve complete solution. The reaction mixture is diluted with water and extracted with ethyl acetate. The ethyl acetate layer is separated, washed with dilute aqueous potassium bicarbonate, dried over anhydrous sodium sulfate and concentrated to dryness under reduced pressure to afford a crystalline residue. Recrystallization from a mixture of methylene chloride, hexane, and ether yields pure 3β-acetoxy-6β-hydroxy-5α-methoxyandrostan-17-one, melting at about 201–203°.

*Example 16*

A mixture of 5 parts of 5β,6β-epoxyandrostane-3β,17β-diol 3,17-diacetate, 0.04 part of p-toluenesulfonic acid monohydrate, and 8 parts of methanol is stirred at room temperature for about 10 minutes, then is warmed to about 40–45° and is stirred for about 5 minutes longer. The reaction mixture is then cooled, an additional 0.04 part of p-toluenesulfonic acid monohydrate is added, and this mixture is stirred at room temperature for about 15 minutes. Dilution with benzene affords an organic solution which is washed successively with dilute aqueous potassium carbonate and water, is dried over anhydrous sodium sulfate, then is evaporated to dryness under reduced pressure. Recrystallization of the resulting residue from ether results in pure 5α-methoxyandrostane-3β,6β,17β-triol 3,17-diacetate, melting at about 201–206°.

*Example 17*

The substitution of 10.2 parts of 5β,6β-epoxyandrostane-3β,17β-diol 3,17-dipropionate in the procedure of Example 1 results in 5α-acetoxyandrostane-3β,6β,17β-triol 3,17-dipropionate.

*Example 18*

By substituting 3.66 parts of 5α-acetoxyandrostane-3β,6β,17β-triol 3,17-dipropionate and otherwise proceeding according to the processes of Example 2, 5α-acetoxy-6β,19-epoxyandrostane-3β,17β-diol 3,17-dipropionate is obtained.

*Example 19*

The substitution of 1.6 parts of 5α-acetoxy-6β,19-epoxyandrostane-3β,17β-diol 3,17-dipropionate in the procedure of Example 9 affords 6β,19-epoxyandrostane-3β,5α,17β-triol, identical with the product of that example.

*Example 20*

By substituting 18.7 parts of 5β,6β-epoxy-3β-propionoxyandrostan-17-one and otherwise proceeding according to the processes of Example 4, 5α-acetoxy-6β-hydroxy-3β-propionoxyandrostan-17-one is obtained.

*Example 21*

The substitution of 26.9 parts of 5α-acetoxy-6β-hydroxy-3β-propionoxyandrostan-17-one in the procedure of Example 5 results in 5α-acetoxy-6β,19-epoxy-3β-propionoxyandrostan-17-one.

*Example 22*

By the substitution of 2.07 parts of 5α-acetoxy-6β,19-epoxy-3β-propionoxyandrostan-17-one in the procedure described in Example 11, 6β,19-epoxy-3β,5α-dihydroxyandrostan-17-one, identical with the product of that example, is obtained.

*Example 23*

By substituting an equivalent quantity of androstane-3β,5α,6β,17β-tetrol 3,5,6,17-tetraacetate and otherwise proceeding according to the procedure described in Example 7, androstane-3β,5α,6β,17β-tetrol 5-acetate is obtained.

*Example 24*

The substitution of an equivalent quantity of androstane-3β,5α,6β,17β-tetrol 5-acetate in the procedure of Example 8 results in androstane-3β,5α,6β,17β-tetrol 3,5,17-triacetate.

*Example 25*

By substituting an equivalent quantity of androstane-3β,5α,6β,17β-tetrol 3,5,17-triaceate and otherwise proceeding according to the processes described in Example 5, 6β,19-epoxyandrostane-3β,5α,17β-triol 3,5,17-triacetate is obtained.

*Example 26*

The hydrolysis of an equivalent quantity of 6β,19-epoxyandrostane-3β,5α,17β-triol 3,5,17-triacetate according to the procedure of Example 12 affords 5α-acetoxy-6β,19-epoxyandrostane-3β,17β-diol.

*Example 27*

An equivalent quantity of 5α-acetoxy-6β,19-epoxyandrostane-3β,17β-diol is oxidized according to the procedure described in Example 13 to afford 5α-acetoxy-6β,19-epoxyandrostane-3,17-dione, identical with the product of that example.

Example 28

By substituting an equivalent quantity of 5β,6β-epoxy-androstane-3β,17β-diol 3,17-dipropionate and otherwise proceeding according to the processes described in Example 3, 5α-acetoxy-6β,19-epoxyandrostane-3β,17β-diol 3,17-dipropionate is obtained.

Example 29

By substituting an equivalent quantity of 5α-acetoxy-6β,19-epoxyandrostane-3β,17β-diol 3,17-dipropionate and otherwise proceeding according to the processes of Example 12, 5α-acetoxy-6β,19-epoxyandrostane-3β,17β-diol is obtained.

Example 30

To 101 parts of tertiary-amyl alcohol is added, in a nitrogen atmosphere at the reflux temperature, 10 parts of potassium, and refluxing is continued until solution is complete. This solution is cooled to about 5° and the resulting suspension of potassium tertiary-pentoxide is diluted with an equal volume of ether. Acetylene gas is passed into the mixture for about 30 minutes, after which time 10 parts of 6β,19-epoxy-3β,5α-dihydroxyandrostan-17-one is added. The addition of acetylene is continued for about 3 hours longer, and this reaction mixture is then stored at 0–5° for about 16 hours. To that mixture is added approximately 100 parts of 10% aqueous ammonium chloride, and the tertiary-amyl alcohol is removed by steam distillation. The solid which separates is collected by filtration, washed with water, and dried. Recrystallization from methanol-ethyl acetate produces pure 6β,19-epoxy-17α-ethynylandrostane-3β,5α,17β-triol, melting at about 285–287°.

Example 31

By substituting an equivalent quantity of 5α-acetoxy-6β,19-epoxy-3β-hydroxyandrostan-17-one and otherwise proceeding according to the processes of Example 30, 6β,19-epoxy-17α-ethynylandrostane-3β,5α,17β-triol is obtained.

Example 32

To a solution of 3 parts of 6β,19-epoxy-17α-ethynylandrostane-3β,5α,17β-triol in 160 parts of acetone is added approximately 3 parts by volume of an aqueous solution, 8 N in chromium trioxide and 8 N in sulfuric acid, until an excess of the oxidant is present. Approximately 2.4 parts of isopropyl alcohol is then added to destroy the excess oxidizing agent, and the solvents are removed by distillation at reduced pressure. The resulting mixture is diluted with water, and the solid material is collected by filtration, then washed and dried. Recrystallization from a mixture of tetrahydrofuran and ethyl acetate results in pure 6β,19-epoxy-17α-ethynyl-5α,17β-dihydroxyandrostan-3-one, melting at about 295–300°.

Example 33

The substitution of an equivalent quantity of 6β,19-epoxy-17α-ethynyl-5α,17β-dihydroxyandrostan-3-one in the procedure of Example 14 results in 17α-ethynyl-17β,19-dihydroxyandrost-4-en-3-one.

Example 34

A mixture of 15 parts of 5α-acetoxy-3β,6β-dihydroxyandrostan-17-one, 1.5 parts of p-toluenesulfonic acid, and 47.3 parts of acetic acid is stirred at room temperature for about 36 hours. The reaction mixture is diluted with approximately 250 parts of water, and the precipitate which forms is collected by filtration, dried, then recrystallized from methylene chloride-hexane to yield 3β,5α-diacetoxy-6β-hydroxyandrostan-17-one, identical with the product of Example 4.

What is claimed is:

1. A process for the manufacture of 19-hydroxyandrost-4-ene-3,17-dione which comprises the steps of contacting a compound of the formula

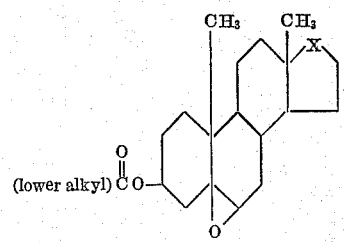

wherein X is selected from the group consisting of carbonyl and β-(lower alkanoyl)oxymethylene, with acetic acid in the presence of an acid catalyst, contacting the resulting 17-oxygenated 5α-acetoxyandrostane-3β,6β-diol 3-(lower alkanoate) with lead tetraacetate to afford the corresponding 17-oxygenated 5α-acetoxy-6β,19-epoxyandrostan-3β-ol 3-(lower alkanoate), selectively hydrolyzing the latter substance with an acidic or alkaline reagent, contacting the resulting 17-oxygenated 5α-acetoxy-6β,19-epoxyandrostan-3β-ol with chromic acid to afford 5α-acetoxy-6β,19-epoxyandrostane-3,17-dione, and contacting that dione with a mixture of zinc and zinc chloride.

2. The process of claim 1, wherein the lower alkyl group is methyl and the group symbolized by X is β-acetoxymethylene.

3. The process of claim 1, wherein the lower alkyl group is methyl and the group symbolized by X is carbonyl.

4. A process for the manufacture of 19-hydroxyandrost-4-ene-3,17-dione which comprises the steps of selectively hydrolyzing a compound of the formula

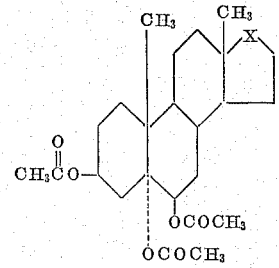

wherein X is selected from the group consisting of carbonyl and β-acetoxymethylene, by contacting that compound with an alkaline reagent in an anhydrous organic solvent medium, selectively acylating the resulting 17-oxygenated 5α-acetoxyandrostane-3β,6β-diol with an acetylating agent, contacting the resulting 17-oxygenated androstane-3β,5α,6β-triol 3,5-diacetate with lead tetraacetate to afford the corresponding 17-oxygenated 6β,19-epoxyandrostane-3β,5α-diol 3,5-diacetate, selectively hydrolyzing the latter substance with an acidic or alkaline reagent, contacting the resulting 17-oxygenated 5α-acetoxy-6β,19-epoxyandrostan-3β-ol with chromic acid to afford 5α-acetoxy-6β,19-epoxyandrostane-3,17-dione, and contacting that dione with a mixture of zinc and zinc chloride.

5. The process of claim 4 wherein the group symbolized by X is β-acetoxymethylene.

6. The process of claim 4 wherein the group symbolized by X is carbonyl.

7. A process for the manufacture of 19-hydroxyandrost-4-ene-3,17-dione which comprises the steps of contacting a compound of the formula

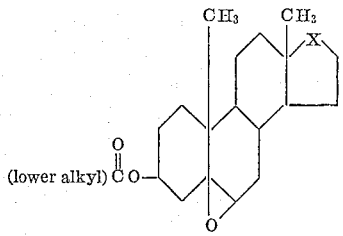

wherein X is selected from the group consisting of carbonyl and β-(lower alkanoyl)oxymethylene, with lead tetraacetate to afford the corresponding 17-oxygenated 5α-acetoxy-6β,19-epoxyandrostan-3β-ol 3-(lower alkanoate), selectively hydrolyzing the latter substance with an acidic or alkaline reagent, contacting the resulting 17-oxygenated 5α-acetoxy-6β,19-epoxyandrostan-3β-ol with chromic acid to afford 5α-acetoxy-6β,19-epoxyandrostane-3,17-dione, and contacting that dione with a mixture of zinc and zinc chloride.

8. The process of claim 7 wherein the lower alkyl group is methyl and the group symbolized by X is β-acetoxymethylene.

9. The process of claim 7 wherein the lower alkyl group is methyl and the group symbolized by X is carbonyl.

10. A process for the manufacture of 19-hydroxyandrost-4-ene-3,17-dione which comprises the steps of contacting a compound of the formula

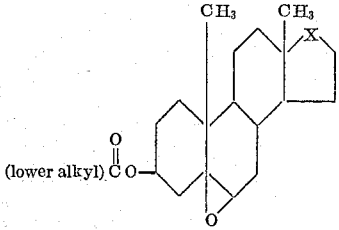

wherein X is a radical selected from the group consisting of carbonyl and β-(lower alkanoyl)oxymethylene, with acetic acid in the presence of an acid catalyst, contacting the resulting 17-oxygenated 5α-acetoxyandrostane-3β,6β-diol 3-(lower alkanoate) with lead tetraacetate to yield the corresponding 17-oxygenated 5α-acetoxy-6β,19-epoxyandrostan-3β-ol 3-(lower alkanoate), hydrolyzing the latter substance with an alkaline reagent, contacting the resulting 17-oxygenated 6β,19-epoxyandrostane-3β,5α-diol with chromic acid to yield 6β,19-epoxy-5α-hydroxyandrostane-3,17-dione, and reacting that substance with zinc and zinc chloride.

11. The process of claim 10, wherein the lower alkyl group is methyl and the group symbolized by X is β-acetoxymethylene.

12. The process of claim 10, wherein the lower alkyl group is methyl and the group symbolized by X is carbonyl.

13. A compound of the formula

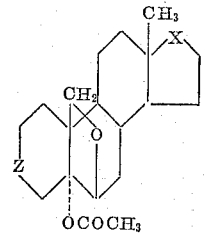

wherein X and Z are selected from the group of radicals consisting of carbonyl, β-hydroxymethylene, and β-(lower alkanoyl)oxymethylene.

14. 3β,5α-diacetoxy-6β,19-epoxyandrostan-17-one.

15. 6β,19-epoxyandrostane-3β,5α,17β-triol-3,5,17 - triacetate.

16. 5α-acetoxy-6β,19-epoxy-3β-hydroxyandrostan - 17-one.

17. 5α-acetoxy-6β,19-epoxyandrostane-3,17-dione.

References Cited in the file of this patent
UNITED STATES PATENTS
3,001,989    Ringold et al.   _____ Sept. 26, 1961
OTHER REFERENCES
Berkoz et al.: "Steroids," vol. 1, No. 3, March 1963, pp. 251–270.